United States Patent Office 3,060,070
Patented Oct. 23, 1962

3,060,070
BONDING OF CHLOROSULPHONATED POLY-ETHYLENE TO NYLON
Everett C. Atwell, Greensboro, N.C., assignor to Burlington Industries, Inc., Greensboro, N.C., a corporation of Delaware
No Drawing. Filed Dec. 2, 1960, Ser. No. 73,221
9 Claims. (Cl. 154—52)

The present invention relates to certain improvements in the bonding of chlorosulphonated polyethylene rubber to nylon fibers.

Because of its outstanding resistance to oil, ozone and chemicals and other desirable characteristics, chlorosulphonated polyethylene rubber (Hypalon) has found substantial use. In some areas of use, e.g. in the preparation of hose or conduits for chemicals, it is desirable to bond the rubber to nylon fibers. However, it is well known in the art that these materials have little natural adhesion to each other and numerous proposals have been made for obtaining an improved bond. Nevertheless, there is still a real need for new methods and techniques which will provide optimum adhesion between these materials.

Accordingly, the principal object of the present invention is to provide a method of bonding chlorosulphonated polyethylene rubber and nylon fibers whereby remarkably outstanding adhesion is obtained. A more specific object of the invention is the provision of a unique pretreatment for nylon fibers to facilitate the increased adhesion to chlorosulphonated polyethylene rubber. Other objects of the invention will also be hereinafter apparent.

Broadly stated, the invention contemplates pretreating the nylon fibers with a primer which gives a surprisingly high bonding effect between chlorosulphonated polyethylene rubber and nylon fibers. This primer may be described as an aqueous composition comprising a neoprene latex and a partially condensed resorcinol-formaldehyde reaction product or resole, particularly the base-catalyzed resole described in my copending applications Serial No. 42,596, now Patent No. 3,030,230, or Serial No. 49,179, the subject matter of said applications being incorporated herein by reference.

The abovementioned pretreatment with latex/resole composition is desirably preceded by treating the fibers with an initial primer comprising an organic polyisocyanate such as methylene bis (4-phenylisocyanate). This gives an even more enhanced bonding effect although, in some instances, the single treatment with latex/resole primer will be sufficient for the desired use.

If the polyisocyanate primer is used according to the invention, the nylon fibers (in fabric form or otherwise) are first impregnated with an organic solvent solution of the polyisocyanate. For this purpose, there should be used a moisture-free organic solvent, e.g. chlorinated or alkylated aromatics such as monochlorobenzene, xylene or toluene. While the amount of isocyanate can be widely varied, it is usually desirable to apply a minimum of 0.5% polyisocyanate solids, based on the weight of dry nylon fibers. An economically practical limit is 2–2.5% polyisocyanate solids. A maximum of 5% is usually in excess and does not provide any further improvement.

As indicated above, methylene bis (4-phenylisocyanate) is a typical polyisocyanate suitable for priming nylon fibers according to the invention. Monoisocyanates are unsatisfactory but other organic polyisocyanates which may be used are polymethylene polyphenyl polyisocyanate having the formula:

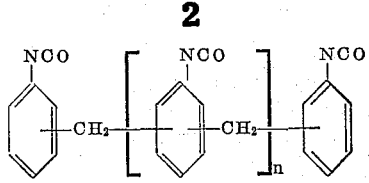

where $n$ is an integer, e.g. the product known as PAPI-1 (Carwin Company), in which $n$ has an average value of 1; Mobay's toluene diisocyanate polymer Mondur CB–60; triphenylmethane triisocyanate (Mondur TM); 3,3-dimethoxyl-4,4'-biphenylene diisocyanate; and p,p'-diphenylmethane diisocyanate (Mondur MO).

After the polyisocyanate has been applied, the treated nylon fibers are dried for solvent removal prior to application of the second primer. Usually, the treated material is heated until dry, using temperatures between 200–300° F. The dried isocyanate treated nylon fibers may then be treated, either immediately or after storage, with the latex/resole primer of the invention. Advantageously, the dried isocyanate-treated material is tack-free and may be rolled up and stored without need for subsequent reactivation of the primer and without detriment to the working properties of the material.

The latex/resole primer may be prepared in the manner described in my abovementioned applications Serial No. 42,956 and Serial No. 49,179 except for the substitution of neoprene latex for the butadiene-acrylonitrile latex used in said applications to prepare the aqueous latex/resole composition. The resole herein is identical to the resole of said pending applications and is prepared by partial reaction of resorcinol and formaldehyde using a basic catalyst in the manner indicated. This latex/resole primer is desirably organic solvent free although small amounts of organic solvent may be included. Zinc oxide or other chlorine acceptor (5–15% on the weight of latex solids) should also be included along with, if desired, softening, wetting and antifoaming agents, etc. Further details regarding the preparation of the neoprene latex/resole composition used herein are included below.

Any commercially available neoprene latex may be used in making up the resole/neoprene latex of the invention. Typically suitable latices are available under the trade names "Neoprene 571" and "Neoprene 750."

The latex/neoprene primer may be applied to the isocyanate-treated nylon fibers in any convenient fashion, e.g. by dipping, padding or spraying. The amount of primer applied to the nylon fibers will vary depending, for example, upon the weight and construction of the nylon material. Typically, the amount of add-on solids to be applied will be at least 5% by weight of the fibers with 15% a practical upper limit although higher percentages, for example 30% or even more, may be used. In any event, it will be realized that the specific amount of add-on solids necessary to give maximum mutual bonding will vary from one situation to another. Usually, the ratio of resole to neoprene latex solids, in parts of solids by weight, will come within the range of from about 1:12 to about 1:2.5, preferably 1 part resole solids per 3.5 to 10 parts neoprene latex solids.

After impregnation, all of the water should be removed from the goods by drying. Various drying temperatures and drying rates may be used so long as the fibrous material is completely dry prior to the step of bonding to the chlorosulphonated polyethylene rubber.

The dried latex/resole primed fibers are also characterized by a non-tacky nature and can be rolled up and stored for long periods of time without losing the bonding affinity for the chlorosulphonated polyethylene. As will be appreciated, this represents an outstanding advantage since the dried fibrous material can be stored until the elastomer is to be applied thereto. A unique feature of the dried material is that, even after long storage, no reactivation of the treated fabric surface is necessary for effective bonding. This is in contrast to known adhesive treated fabrics wherein the reactivation, for example, by organic solvent treatment or water, is essential to effect bonding after storage.

The latex-resole primed nylon fibers, with or without the preliminary priming with polyisocyanate, may be bonded to conventional vulcanizable chlorosulphonated polyethylene compositions. As indicated heretofore, chlorosulphonated polyethylene rubber is available under the trade name "Hypalon," for example, Hypalon S–2. Suitable vulcanizable compositions for use herein are available, for example, as hose stock for preparing hose or conduits for acids or other chemicals. These compositions include the usual metallic oxide accelerator and organic acid and may have the following representative makeup:

| | Parts |
|---|---|
| Hypalon S–2 | 100 |
| Zinc oxide | 5–20 |
| Sulfur | 2–3 |
| Stearic acid | 1–3 |

The chlorosulphonated polyethylene may be applied to the resole/latex primed nylon fibers in conventional fashion. Thus, for example, vulcanizable Hypalon composition as referred to above in sheet form, may be pressed against nylon fabric prepared according to the invention and vulcanized under conventional conditions (e.g. 290° F. to 300° F. and desirably 125 to 250 p.s.i. pressure for 30 to 45 minutes).

The invention is illustrated, but not limited, by the following examples wherein parts and percentages are by weight unless otherwise stated:

EXAMPLE I

This example describes the preparation of a suitable resole/latex composition suitable for use herein.

*Resole/Latex Primer*

PART A.—RESIN SOLUTION

| | Parts |
|---|---|
| Resorcinol | 5.1 |
| 37% formaldehyde | 6.5 |
| NaOH flakes | .15–.30 |
| Water | 110 |
| (6.25% resin solution) approximately | 122 |

PART B.—20% SOLIDS

| | |
|---|---|
| 55% neoprene latex No. 571 | 92.5 |
| 57% zinc oxide paste | 13.5 |
| 6.25% resin solution (Part A) | 116.7 |
| Water | 107.5 |
| | 330.2 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

*Preparation of Part B*

The neoprene latex No. 571 was measured into a mixing tank with stirring. The zinc oxide paste was added followed by the water (preferably with sufficient ammonia to give a pH of above 9, typically 9.6), and resin solution (Part A). As described in Serial No. 42,956, the pH of the resole/latex dispersion is desirably kept above 9 to insure against gelation of the latex.

The resulting dispersion (18% solids) was ready for immediate use but may be stored for a limited time (about 2 days) at room temperature or for prolonged periods of time under refrigeration.

EXAMPLE II

The resole/neoprene latex primer of Example I was also prepared by repeating Example I except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arrested resin solution was added 4.3 parts of 37% formaldehyde and 108 parts of water, the water being added first, with agitation. The resulting mixture was aged for from 1–6 hours at 80–84° F.

After the ageing period, the dispersion with neoprene latex was prepared as in Example I.

EXAMPLE III

This example illustrates preparation of a dual primed nylon fabric and the bonding thereof to chlorosulphonated polyethylene (Hypalon) rubber.

A first primer was prepared by dissolving sufficient methylene bis (4-phenylisocyanate), typically Hylene M–50, in xylene freed from moisture to provide a 10% solids solution.

A piece of nylon fabric (5 oz./sq. yard) was then padded through the xylene solution so as to leave 3–3.5% Hylene solids on the cloth. The fabric was dried at 220° F. for solvent removal.

The thus treated fabric was then run through the primer of Example I (18% solids) and the pad squeeze rolls. This was done two times so as to get a solids add-on of 12–15%. The fabric was dried at 220° F. after each passage through the squeeze rolls. The thus treated fabric was then subjected to a final cure at 320° F. for 5 minutes to remove all traces of moisture and to fully polymerize and crosslink the resole/latex solids. This curing step may be omitted, if desired, with some decrease in potential adhesion. Temperature and time for this cure can be varied but usually will be within the range of 300 to 330° F. for 3–5 minutes.

Conventionally compounded Hypalon-S sheet (hose stock about .040 inch thick) was then pressed into contact with the dual primed fabric and vulcanized at 300° F. for 30 minutes. In contrast to an adhesion of 2 pounds using no primer or only the polyisocyanate primer, the dual primed fabric processed according to the above example exhibited an adhesion to the Hypalon sheet of 31 to 35 pounds per inch width, the measurement being made on a peel test when the test jaws were separated at a rate of 2" per minute. Substantially equivalent adhesion was obtained using the product of Example I as the second primer.

EXAMPLE IV

The process of Example III was repeated except that the first primer was omitted. The resulting adhesion between the nylon fabric and Hypalon sheet was 24 to 28 pounds per inch width. While this is somewhat less than the dual primed adhesion, it represents a substantial and important increase over the 2 pounds adhesion obtained without any primer or with only the polyisocyanate primer.

EXAMPLE V

The process of Example III was repeated using the polymethylene polyphenyl polyisocyanate product known as PAPI–1 as the polyisocyanate component of the first primer with essentially the same improvement in adhesion between the Hypalon sheet and the fabric.

It will be appreciated that various other modifications may be made in the invention described herein. For instance, any of the other organic polyisocyanates referred to above may be substituted for those utilized in the foregoing examples. Accordingly, the scope of the invention is defined in the following claims wherein I claim:

1. In a process for bonding nylon to chlorosulphonated polyethylene rubber, the improvement which comprises treating said nylon with a composition containing resorcinolformaldehyde and a neoprene latex prior to bonding of the rubber to said nylon.

2. In a process for bonding nylon fibers to chlorosulphonated polyethylene rubber, the improvement which comprises first treating said nylon fibers with an organic solvent solution of an organic polyisocyanate, drying the thus treated fibers, then treating said fibers with an organic solvent-free aqueous composition including a resole and a neoprene latex, and again drying the thus treated material, said treating and drying steps preceding the application of the chlorosulphonated polyethylene to said nylon.

3. The process of claim 2 including the further step of curing said resole/latex after drying said fibers, said curing step being carried out prior to the bonding of said chlorosulphonated polyethylene rubber.

4. The process of claim 2 including the further step of applying said chlorosulphonated polyethylene rubber to the dried, dual treated nylon fibers and then vulcanizing the same.

5. The process of claim 2 wherein the amount of polyisocyanate solids applied to said nylon is at least 0.5%, based on the weight of dry fibers and the amount of latex/resole solids is at least 5%, based on the weight of the dry fibers.

6. The process of claim 1 wherein the ratio of resole solids to neoprene latex solids is between 1:12 and 1:2.5.

7. The product obtained by the process of claim 1.
8. The product obtained by the process of claim 2.
9. The product obtained by the process of claim 4.

References Cited in the file of this patent
UNITED STATES PATENTS

| | | |
|---|---|---|
| 2,990,313 | Knowles | June 27, 1961 |
| 2,991,258 | Nobbs et al. | July 4, 1961 |

FOREIGN PATENTS

| | | |
|---|---|---|
| 595,290 | Great Britain | Dec. 1, 1947 |